Patented June 24, 1930

1,765,870

UNITED STATES PATENT OFFICE

ALPHONS O. JAEGER AND JOHANN A. BERTSCH, OF ST. LOUIS, MISSOURI; SAID JAEGER ASSIGNOR, BY MESNE ASSIGNMENTS, TO THE SELDEN RESEARCH & ENGINEERING CORPORATION, OF PITTSBURGH, PENNSYLVANIA, A CORPORATION OF DELAWARE

PREPARATION OF VANADIC ACID

No Drawing.   Application filed May 15, 1926.   Serial No. 109,429.

This invention relates to the preparation of vanadic acid, and, more particularly, to the preparation of vanadic acid of high purity which is suitable for catalytic purposes.

Vanadic acid of high purity is required for many metallurgical and chemical purposes and particularly for the production of catalysts. The commercial product is often unsatisfactory, particularly for catalytic purposes as it is far from pure and contains a considerable amount of substances which are harmful especially in catalytic reactions. Thus, for example, heavy metals such as iron, cobalt, nickel, copper, chromium, aluminum, manganese and the like are frequently present and exert a deleterious effect on catalytic reactions in which vanadium catalysts are used, often producing side reactions or weakening the catalytic strength of the catalyst so as to reduce the output and in many cases to render the catalytic process uneconomical. Silicic acid is also frequently found in commercial vanadic acid and not only does it reduce the value of the product as a chemical, but it frequently introduces undesirable impurities such as heavy metals in the form of insoluble silicates or occluded in the colloidal silicic acid. Commercial vanadic acid also often contains alkali particularly when it has been precipitated from alkali metal vanadate solutions by means of ammonium chloride, the ammonium vanadate produced then being destroyed. The impurities referred to above are, of course, not the only ones present in commercial vanadic acids and many other undesirable products may be present, depending on the raw material from which the vanadic acid is prepared. Some of these impurities can be removed more or less readily, but many of them and particularly the ones specifically referred to above present very serious difficulties and in some cases cannot be removed completely at all.

It is one of the objects of the present invention to produce vanadic acid of high purity which is suitable for catalytic and other purposes. It is a further object of the present invention to produce highly purified vanadic acid by a simple and reliable method and without excessive cost. Other and further objects of the invention will appear from the more detailed description which follows.

According to the present invention, vanadium ores are broken up in any of the usual and well known methods to produce solutions of vanadium compounds, particularly alkali metal vanadates. The present invention is not concerned with the treatment of the ore itself and is not limited to any particular method of setting free the vanadium compounds in soluble form. The crude vanadate solution, which may contain vanadium of other stages of oxidation and which contains many impurities depending on the raw material from which the vanadium is produced, is then subjected to a process in which the crude solution is first oxidized without filtration, the solution, of course, remaining alkaline. The oxidized solution is then acidified with acid or acid salts to neutrality and is then made acid to litmus, the coarser impurities being precipitated out and removed by filtration, if desired. The acidulated solution is then again oxidized, either by the same oxidizing agent as in the first oxidation in alkaline solution, or by a different oxidizing agent. After oxidation is completed, the acid solution is heated and is then made slightly ammoniacal, precipitating out all the impurities which are then removed by filtration. The alkali vanadate solution which remains is treated to recover the purified vanadic acid either as a salt or as a free acid. Mother liquors and wash liquors which occur in the process may be treated for recovery of their vanadium content by making them slightly ammoniacal and precipitating out the vanadium by means of a barium salt. The barium-vanadium compounds are then decomposed with acid and the vanadic acid thus freed is added to the crude solution in the next batch. In the above description of the steps of the present invention, the particular raw materials and oxidizing agents have not been specified since the invention in its broader aspects is not limited to any particular raw material or to any particular oxidizing agent, although in its more specific aspects, certain particular oxidizing agents are included as specific features of the invention.

The raw materials may be any ordinary vanadium ores, vanadium alloys, scrap vanadium, or other materials which contain vanadium such as for example, spent vanadium catalysts. As has been pointed out above, the raw material may be treated by any of the well known methods of bringing vanadium compounds into solution.

The oxidation step in alkaline solution which forms the first step of the invention is preferably carried out to the point at which all the vanadium is transformed into the vanadate form and dissolved and further the oxidation partly oxidizes the ferrous iron to ferric iron and the manganese into tetravalent compounds, particularly when bromine or hydrogen peroxide is used as an oxidizing agent. Any arsenic present is oxidized to arsenic acid and nitrites are transformed into nitrates. Many oxidizing agents can be used such as chlorine, bromine, oxyacids and salts of chlorine and bromine, hydrogen peroxide, ozone, alkali peroxides and even oxygen at high temperatures. Preferably, oxidizing agents should be used which do not introduce undesired products or which introduce compounds that cannot be readily removed at a later stage. The oxidizing agents can be in a free or combined state in gaseous, liquid or dissolved state and one or more oxidizing agents can be used simultaneously or successively. The oxidation can be carried out either in the cold or at an elevated temperature.

When alkaline earth metals are present, it is desirable to add alkali metal carbonates in order to precipitate them. Many heavy metals, such as nickel, cobalt, copper or the like must also be precipitated by the addition of sufficient carbonate to the alkaline solution and may be removed by filtration. When barium alone is present, it can be removed by the addition of a sulfate or sulfuric acid, the amount added being calculated on the barium content. A special filtration is not necessary in the case of barium precipitation.

The neutralization of the alkaline solution which is the second step of the present invention is quite different from neutralization of alkali metal vanadate solutions which have been prepared hitherto in that the solution is rendered slightly acid instead of merely neutral. The acids or acid salts used in acidifying are preferably inorganic acids and particularly acids which do not produce difficultly soluble salts of heavy metals on working up the mother liquors and wash liquors. For example, sulfuric acid is undesirable when barium is present as it results in the formation of barium sulfate. Where, however, the mother liquors and wash liquors are not to be worked up, the choice of acid is much wider and it makes no difference whether the acid used tends to form difficultly soluble heavy metal compounds. In general, we prefer to use hydrochloric acid or nitric acid although the invention is not limited to the use of these acids which merely constitute the preferred embodiment of the invention. Acidification beyond the neutral point to litmus not only precipitates compounds which are only soluble in alkalies, but also precipitates colloidal silicic acid which may carry down a little free vanadic acid.

The third step of the present invention consists in oxidizing the acidified solution which may take place without further filtration. Preferably, the reaction is carried out at an elevated temperature, but the invention is not limited to this procedure and in some cases the reaction may be carried out in the cold. The oxidation may be a continuation of the alkali oxidization in the first step of the process using the same oxidizing media such as hypochlorites, hypobromites, etc., which give off oxygen in a nascent state. Where a readily decomposed oxidizing agent, such as hydrogen peroxide or ozone, is used in the first step, it is usually necessary to carry out an independent oxidation in the third step.

As a result of the oxidation in acid solution, the last traces of iron are oxidized to the ferric state and the last traces of silica are coagulated. We find that chlorine or bromine or hydrogen peroxide should preferably be present as one of the oxidizing agents as they tend to prevent the reduction of vanadic acids when nitrites are present. If phosporic acid or arsenic acid are present, a calculated amount of a magnesium salt should be added in order to precipitate these products in a later stage as the magnesium ammonium phosphate or arsenate.

In the fourth step of the process, the oxidized acid solution is heated nearly to the boiling point and sufficient ammonia is added to dissolve up the finely divided vanadic acid which may have been precipitated in the second step and to impart to the liquid an alkaline reaction. The last traces of impurities are removed by the addition of ammonia, and the iron, aluminum, trivalent chromium, phosphates, arsenates and silicates are precipitated. The hot solution is filtered and the precipitate washed with warm dilute ammonia water, the wash liquor being added to the filtrate which contains in solution potassium and ammonium vanadate free from the impurities described above. Chromic acid may be present in the filtrate, but does not affect the following purification step as it is washed out quantitatively.

In the fifth step of the process, the light greenish solution is heated and a hot, saturated, iron-free ammonium chloride solution is stirred in with vigorous agitation. The ammonium chloride solution may be freed from iron by adding ammonia and precipitating the iron out with hydrogen sulfide.

The vanadate solution treated with ammonium chloride is then cooled down with vigorous agitation whereupon the majority of the vanadic acid present in the solution is precipitated in the form of the ammonium metavanadate. The precipitate is then filtered off with suction and the filter cake is preferably stirred into a slurry with hot ammoniacal water, permited to cool and the wash liquor filtered off. The washing of the ammonium vanadate must be continued until the wash liquor and the ammonium vanadate itself shows no trace of chlorine. The ammonium vanadate thus produced is a white or slightly greenish finely crystalline body of very high purity. The product does not give any test for iron with sulfocyanide in ether.

Chemically pure vanadic acid is prepared from the ammonium vanadate by heating at a temperature which is considerably lower than that usually used, the heating taking place in a stream of oxygen at temperatures below red heat and below the melting point of the material. The heating is carried on until a sample shows no test for ammonia with curcuma paper. The product is then permitted to cool in the oxygen stream in order to prevent dissociation and a finely crystalline, chemically pure vanadic acid is produced, the product having a beautiful reddish-yellow color. The low temperature used in decomposing the ammonium vanadate and the continued presence of oxygen prevents the formation of lower oxides of vanadium and results in a product of extraordinary purity.

When it is desired to work up the mother liquors and wash liquors which may contain only a very few percent of the original vanadic acid content, they are collected and hydrochloric acid is stirred in until the liquid just remains slightly alkaline and ammonia is then added until the odor of ammonia is distinctly perceptible. Barium chloride is then added with vigorous agitation until no more precipitation takes place. The barium-vanadium compounds which are precipitated out are then filtered with suction and washed. Small amounts of vanadic acid are recovered in this way.

The barium-vanadium compounds produced, as described above, are heated and decomposed with nitric or hydrochloric acid with vigorous agitation, resulting in the precipitation of vanadic acid which is contaminated with barium and which can be added to the next batch of crude vanadic acid to be purified.

The following examples will illustrate the invention but, of course, are not in any sense to be considered as limiting it,

*Example 1*

100 parts of crude vanadic acid containing about 84% of $V_2O_5$ and containing $SiO_2$, iron and alkali as impurities, are treated with 460 parts of water and 38.5 parts of 100% NaOH are added. The resulting solution is dark colored due to the presence of the impurities. Chlorine gas is then passed through the hot solution and continued until the color turns brownish-yellow and does not show any further change. 11 parts of hydrogen chloride in the form of a 10% solution are gradually added to produce neutrality to litmus and then the solution is acidified with 1 part of nitric acid, the liquid being kept continuously at the boiling point. Ammonia water is then added until the lumps of vanadic acid have disappeared and the liquid gives off a distinct odor of ammonia. The solution is permitted to stand at an elevated temperature and all of the impurities can then be filtered out whereupon the light green solution (540 volumes) are treated with from 50 to 70 parts of pure ammonium chloride in the form of a 30% solution, the temperature being maintained at a high point. The mixture is vigorously stirred and permitted to gradually cool, resulting in the precipitation of small crystals of ammonium metavanadate which are removed by filtration. The crystal cake is then stirred with 200 parts of water, again filtered and the washing continued until neither the wash water nor the crystals show any traces of chlorine. The yield of crystals is about 88–90% of the theoretical and they consist of very pure ammonium metavanadate, showing no trace of iron.

The ammonium metavanadate is first heated in a muffle at temperatures of 200–300° C. in a stream of air and then at 300–400° C. in a stream of oxygen, the latter heating being continued for about two hours with stirring. The hot product is then permitted to cool in a stream of oxygen, producing vanadium pentoxide of practically 100% purity and free from lower oxides.

The mother liquors and wash liquors from the process constitute a very dilute vanadium contaning solution which can be heated until the solution becomes clear and then sufficient hydrochloric acid added until the liquid is just alkaline whereupon ammonia is added until its odor becomes clearly perceptible. The vanadium is precipitated with a 10% solution of barium chloride, the addition taking place until a test shows no further precipitation with barium chloride. The barium compound of vanadium is then filtered, stirred to a slurry and rendered acid to congo with nitric acid, the product being stirred continuously. A red-brown vanadic acid precipitates out, amounting to about 6% of the total vanadium content of the original crude vanadic acid. This recovered vanadic acid is added to the crude vanadic acid of the next batch. It will be seen that the total recovery of vanadium is about 96%.

Example 2

A commercial vanadic acid which contains as impurities $SiO_2$, iron, manganese, barium, $P_2O_5$ and $As_2O_5$, together with lower oxides of vanadium and some alkali, is stirred with water to form a dark alkaline slurry which is then treated with sufficient sulfuric acid to precipitate the barium as barium sulfate. Bromine water is added to the alkaline solution until a strong odor of bromine becomes perceptible whereupon the manganese precipitates out as a dioxide. The liquid is then filtered and the filtrate treated with sufficient magnesium chloride to combine with the phosphoric and arsenic acid present. The filtrate is then neutralized with hydrochloric acid and slightly acidified and chlorine water added until the solution becomes yellow. The mixture is then heated to about 70° C. and ammonia gradually added until the liquid becomes just alkaline. Iron and $SiO_2$ precipitate out in flocks and after standing for about 8 hours, the arsenic and phosphoric acids also precipitate out in the form of fine crystals as magnesium-ammonium-arsenate and phosphate, respectively.

The filtrate is treated as in Example 1 to form ammonium vanadate which is then decomposed to vanadic acid. The mother liquors and wash liquors are then treated with barium chloride as described in Example 1 and the vanadic acid recovered is reused.

Example 3

A well purified vanadic acid which is almost free from lower oxides of vanadium and which contains nitric acid and iron which render it undesirable for catalytic purposes is dissolved in a caustic soda solution and made just acid to litmus with hydrochloric acid. Hydrogen peroxide is added and a little chlorine is passed through at an elevated temperature, whereupon ammonia is added at 80 or 90° C. until the solution is just alkaline. The solution is stirred and permitted to settle, precipitating out the iron in fine flocks which can be removed by hot filtration. The hot filtrate is then worked up into ammonium metavanadate and vanadic acid as described in Example 1. The vanadic acid obtained is free from iron and nitric acid and even if the caustic soda contains small traces of iron and silicic acid, they are removed by precipitation with ammonia. In all cases, of course, the precipitation of the ammonium vanadate must take place with iron-free ammonium chloride which may be prepared as described above by precipitating the iron with hydrogen sulfide in the presence of ammonia and boiling the solution to remove the hydrogen sulfide. Any sulfur precipitated can be removed by filtration.

We claim:

1. The method of producing purified vanadic acid, which comprises subjecting a crude vanadate solution to oxidation in alkaline solution rendering the solution acid to litmus, and carrying out a further oxidation in the acid solution, the total amount of oxidation being sufficient to transform all of the vanadium compounds into the pentavalent state and to transform all impurities into products which can be separated from the vanadium compounds.

2. A method according to claim 1, in which the oxidizing agent is an elementary halogen.

3. The method according to claim 1 in which at least part of the oxidation takes place in alkaline solution and at least part of the oxidation takes place in a solution which is acid to litmus, the same oxidizing agent being used in both oxidations.

4. The method according to claim 1 in which at least part of the oxidation is carried out in alkaline solution and at least part is carried out in a solution which is acid to litmus, different oxidizing agents being used in the acid and alkaline oxidations.

5. The method of producing purified vanadium compounds from crude alkaline vanadate solutions, which comprises oxidizing the solution while still alkaline, removing at least part of the oxidized impurities, rendering the solution acid to litmus by means of acid bodies which do not form compounds with the remaining impurities difficult of separation from vanadates, and further oxidizing the acidified solution.

6. The method according to claim 5 in which at least one of the acid bodies used in acidifying the solution is an inorganic acid body.

7. The method of producing purified vanadium compounds from crude vanadate solutions containing among their impurities compounds which are capable of forming insoluble carbonates, which comprises treating the solution with a sufficient amount of soluble carbonates to precipitate all of the impurities which contain elements capable of forming insoluble carbonates, removing the precipitated impurities and subjecting the solution to sufficient oxidation to transform substantially all of the remaining impurities into products which are readily separated from soluble vanadates.

8. The method of producing purified vanadic acid compounds from crude alkaline vanadate solutions containing among their impurities compounds of arsenic or phosphorus, which comprises subjecting the crude alkaline solution to oxidation, removing insoluble oxidized impurities, acidifying to litmus, adding sufficient magnesium compounds to react with the arsenic and phosphorus compounds present, oxidizing in acid solution, neutralizing with ammonia and removing the vanadate compounds in solution from the insoluble oxidized impurities and from the insoluble magnesium-ammonium compounds of arsenic and phosphoric acid formed.

9. The method of producing iron-free vanadic acid from crude alkaline vanadate solutions containing iron among their impurities, which comprises removing impurities capable of forming insoluble compounds with carbonates or sulfates, oxidizing the alkaline solution to transform substantially all of the vanadium present into the pentavalent form and to oxidize a substantial portion of the impurities including the iron, acidifying to litmus, oxidizing until all of the impurities including the iron are transformed into higher stages of oxidation, neutralizing with ammonia, removing by filtration the precipitated iron and other impurities, treating the resulting solution of ammonium and alkali metavanadates with sufficient iron-free ammonium chloride to transform substantially all of the alkali metal vanadates into ammonium vanadates, effecting precipitating of the ammonium vanadate, separating it from the mother liquor by filtration, washing the precipitate with ammonia water until chlorine compounds have been completely removed, adding at least part of the wash water to the mother liquor, preciptating and removing vanadium present in the mother liquor and wash by means of a soluble barium compound, decomposing the barium vanadium compound formed with acid, and adding the vanadic acid thus produced to a second batch of crude vanadic acid solution.

Signed at city of St. Louis, Mo., this 11th day of May, 1926.

ALPHONS O. JAEGER.
JOHANN A. BERTSCH.